(12) United States Patent
Wienke

(10) Patent No.: US 8,360,700 B2
(45) Date of Patent: Jan. 29, 2013

(54) CARGO NET

(75) Inventor: Dietrich D. Wienke, Elsloo (NL)

(73) Assignee: DSM IP Assets B.V., Heerlen (NL)

( * ) Notice: Subject to any disclaimer, the term of this patent is extended or adjusted under 35 U.S.C. 154(b) by 576 days.

(21) Appl. No.: 12/305,503

(22) PCT Filed: Jun. 21, 2007

(86) PCT No.: PCT/EP2007/005472
§ 371 (c)(1),
(2), (4) Date: Sep. 4, 2009

(87) PCT Pub. No.: WO2007/147594
PCT Pub. Date: Dec. 27, 2007

(65) Prior Publication Data
US 2010/0040428 A1    Feb. 18, 2010

(30) Foreign Application Priority Data

Jun. 23, 2006   (EP) .................................... 06012959

(51) Int. Cl.
*B60P 7/08* (2006.01)
(52) U.S. Cl. ..................................................... 410/118
(58) Field of Classification Search .................. 410/96, 410/97, 117, 118, 129; 87/2, 3, 5; 244/118.1; 248/499
See application file for complete search history.

(56) References Cited

U.S. PATENT DOCUMENTS

| | | | |
|---|---|---|---|
| 3,011,820 A | 12/1961 | Frieder et al. | |
| 4,819,458 A | 4/1989 | Kavesh et al. | |
| 4,852,330 A | 8/1989 | Carangelo | |
| 6,435,786 B1 * | 8/2002 | Breckel et al. | 410/118 |
| 6,637,991 B2 * | 10/2003 | Looker et al. | 410/97 |
| 6,755,232 B1 * | 6/2004 | Holland et al. | |
| 2003/0123946 A1 | 7/2003 | Looker et al. | |

FOREIGN PATENT DOCUMENTS

| | | |
|---|---|---|
| EP | 0 310 199 | 4/1989 |
| EP | 0 318 136 | 5/1989 |
| GB | 2 338 472 | 12/1999 |
| JP | 5-9879 | 1/1993 |
| JP | 6-57056 | 3/1994 |
| JP | 8-47971 | 2/1996 |
| JP | 2002-266186 | 9/2002 |
| JP | 2002-339179 | 11/2002 |
| JP | 2003-1732 | 1/2003 |
| JP | 2005-177499 | 7/2005 |

OTHER PUBLICATIONS

International Search Report for PCT/EP2007/005472, mailed Sep. 25, 2007.
Japanese Office Action mailed May 8, 2012.
Japanese Office Action mailed Sep. 25, 2012.

* cited by examiner

*Primary Examiner* — Stephen Gordon
(74) *Attorney, Agent, or Firm* — Nixon & Vanderhye P.C.

(57) ABSTRACT

The invention relates to a cargo net comprising a plurality of interconnected straps arranged in a lattice structure wherein that the straps comprise ultrahigh molecular weight polyethylene (UHMWPE) multifilament yarns, the UHMWPE yarns having a tenacity of at least 1.9 N/tex. In one embodiment, the cargo net according to the invention is a cargo net to anchor loads onto pallets. In another embodiment, the cargo net according to the invention is a barrier cargo net for restraining cargo or other objects from entering a secure or off limits area. IR visibility of the cargo net was measured for the two infrared ranges of 3-5 μm and 8-12 μm where most of the detectors of the thermal imaging devices function.

13 Claims, No Drawings

CARGO NET

This application is the U.S. national phase of International Application No. PCT/EP2007/005472, filed 21 Jun. 2007, which designated the U.S. and claims priority to Europe Application No. 06012959.0, filed 23 Jun. 2006, the entire contents of each of which are hereby incorporated by reference.

The invention relates to a cargo net comprising a plurality of interconnected straps arranged in a lattice structure.

During air transportation, i.e. shipping and delivery, the cargo must be tightly secured such that during aircraft landing, or should the aircraft execute an unusual maneuver, the cargo should be able to remain in its original position.

A variety of retention systems for securing the cargo are known in the art, among them a retention system comprising a cargo net being mostly used in air transportation. U.S. Pat. No. 3,961,585 discloses such a cargo net, having a plurality of intersecting straps forming a lattice structure which is adapted to maintain the load on a support or a pallet. The use of straps instead of ropes in building cargo nets is especially advantageous. The straps prove to be more effective in securing the cargo, being also less affected by wear because of their better grip to the cargo, i.e. less friction between the straps and the cargo. Therefore, the cargo nets comprising a plurality of interconnecting straps arranged in a lattice structure are preferentially used in securing cargo for air transportation preferably in heavy-duty applications. Furthermore, such cargo nets are also utilized inside the aircraft as barrier cargo nets. Barrier cargo nets are mounted vertically between the top, the floor and the sides of the aircraft to provide a barrier for the eventual shifting cargo.

Air transportation of cargo is often employed in locations where the ground transportation network is poorly developed. Most often in these locations, the threat of hostile forces operating near the receiving point is a clear and present danger, and therefore, most cargo deliveries or extractions are performed during nighttime. To prevent the hostile forces to target the cargo during nighttime, the cargo is often camouflaged against thermal imaging devices and missiles with infrared (IR) guidance heads.

The problem with the existent cargo nets made of nylon or polyester such as the one disclosed by U.S. Pat. No. 3,961,585 is that they do not provide any protection against reconnaissance with thermal imaging devices equipped with detectors for infrared radiation. The existent cargo nets encompassing a cargo have an increased IR visibility making the entire cargo highly visible by thermal imaging devices. Especially, because the IR visibility of a cargo net changes periodically from regions with high IR visibility, i.e. the straps comprising the cargo net, to regions with low IR visibility, i.e. the void spaces between said straps, said cargo net is strikingly visible during nighttime as a foreign structure clearly discernable from the background of the environment. Also when used inside the aircraft as barrier cargo nets, said nets have an increased IR visibility making the interior of the aircraft visible and an easy target for missiles with IR guidance heads.

Hence, it is the object of the present invention to provide a cargo net with a very low IR visibility during nighttime.

Surprisingly, the aimed object is obtained by a cargo net comprising straps, said straps comprising ultrahigh molecular weight polyethylene (UHMWPE) multifilament yarns, said yarns having a tenacity of at least 1.9 N/tex.

Surprisingly, it has been found that the cargo net according to the invention presents a very low IR visibility during nighttime. Especially in the thermal ranges of 3-5 µm and 8-12 µm where most of the detectors of the thermal imaging devices function, the IR visibility of said cargo net is very low.

A further advantage of the cargo net according to the invention is that said cargo net presents a reduced IR visibility when heated by the objects underneath. It has also surprisingly been found that said cargo net effectively reduces the hot spots present in the objects underneath. The hot spots are locations on the objects' surface presenting a high concentration of thermal radiation and therefore increased IR visibility.

Yet a further advantage is that by reducing the hot spots, a much lower IR contrast between the objects and said cargo net is observable with the thermal imaging devices.

Yet a further advantage of the cargo net according to the invention is that said cargo net presents also a low reflectivity for radiations originating from military and civil conventional RADAR sources, helping therefore in reducing said cargo net's RADAR visibility.

Further advantages of the present invention will become more apparent from a consideration of the following detailed description in conjunction with the accompanying examples.

The multifilament UHMWPE yarns used to build the straps comprising the cargo net according to the invention, preferably contain at least 5 UHMWPE filaments, said UHMWPE filaments being produced according to the so-called gel-spinning process as for example described in EP 0205960 A, EP 0213208 A1, U.S. Pat. No. 4,413,110, GB 2042414 A, EP 0200547 B1, EP 0472114 B1, WO 01/73173 A1, and Advanced Fiber Spinning Technology, Ed. T. Nakajima, Woodhead Publ. Ltd (1994), ISBN 1-855-73182-7, and references cited therein. Gel spinning is understood to include at least the steps of spinning at least one filament from a solution of ultra-high molecular weight polyethylene in a spin solvent; cooling the filament obtained to form a gel filament; removing at least partly the spin solvent from the gel filament; and drawing the filament in at least one drawing step before, during or after removing spin solvent. Suitable spin solvents include for example paraffins, mineral oil, kerosene or decalin. Spin solvent can be removed by evaporation, by extraction, or by a combination of evaporation and extraction routes.

More preferably, the number of filaments in the yarn is for example at least 10, more preferably at least 50, more preferably at least 100, more preferably at least 200, even more preferably at least 400, yet even more preferably at least 600 or yet even more preferably at least 850. The filaments may have a linear density or titer varying in a wide range, preferably the titer of the filaments being at most 50 dtex per filament, more preferably at most 20 dtex, and most preferably at most 10 dtex.

Preferably, the UHMWPE multifilament yarns have a tensile strength of at least 2.2 N/tex, more preferably of at least 2.8 N/tex and most preferably of at least 3.5 N/tex. The tensile strength, is determined on multifilament yarns as specified in ASTM D885M, using a nominal gauge length of the fiber of 500 mm, a crosshead speed of 50%/min and Instron 2714 clamps, type Fibre Grip D5618C.

The multifilament UHMWPE yarns may be woven or knitted to generate a strap having a construction according to any construction known in the art. Preferably, the straps have a plain weave construction. More preferably, said straps have a twill weave construction.

In the most preferred embodiment, said straps have a n-ply webbing construction, where n is preferably at least 4, more preferably 3, most preferably 2.

The n-ply webbing construction is preferred because said straps with said construction present a relatively rough surface structure that helps in scattering the infrared radiation and therefore, preventing reflections of IR radiation from external sources.

The straps can be constructed with different tightness factors in order to adjust the mechanical properties of said straps. The tightness factor is herein defined as the number of yarns extending in a direction parallel to the longitudinal axis of the strap multiplied by the yarn's titer per unit length. Preferably, the tightness factor is chosen such that said straps have an elongation to break of at most 6%, more preferably an elongation to break of at most 4%.

By strap is herein understood a flexible, elongated body having a thickness much smaller than its width.

The straps comprising the cargo net according to the invention preferably have a width of at least 1.0 cm, more preferably a width of at least 2.0 cm. Said straps preferably have a width of at most 4.5 cm, yet even more preferably a width of at most 3.5 cm. The thickness of the straps is preferably chosen such that said straps have a ratio width/thickness of at least 5:1, more preferably at least 10:1. Preferably, said straps have a width/thickness ratio of at most 50:1, even more preferably of at most 40:1, most preferably of at most 20:1.

The advantage of said cargo net comprising straps with such a reduced width/thickness ratio is that said cargo net is even less visible by thermal imaging devices during nighttime and furthermore, said cargo net being lightweight and easy to handle while maintaining its strength.

To improve the camouflaging properties of the cargo net according to the invention also during daylight, the polyethylene yarns comprising the straps of said cargo net may be colored through low thermal emission camouflage pigments. The pigments provide said straps with coloration that is in satisfactory harmony with the environment of their use and therefore provide camouflage also during daylight. Said straps may be further impregnated or coated with other agents, e.g. flame retardant agents in order to improve the fire resistance of said cargo net. However, such agents should preferably have an IR visibility of at most equal with or lower than the IR visibility of the straps.

The structure of the cargo net according to the invention may be of any structure known in the art. The most preferred structures are a diamond- or square-patterned net.

The cargo net may also comprise separate sections such as top, front, rear and side sections. The cargo net may further comprise sections needed to restrain cargo having various sizes and intricate shapes. The cargo net may also be a unitary or integral structure having front and rear sections connected to side sections through a top section. The cargo net may also be a one-piece construction of cruciform shape having a center section or central panel section, with a plurality of wing sections or side flaps extending outwardly therefrom.

In a preferred embodiment, the cargo net according to the invention is a cargo net to anchor loads onto pallets. In this preferred embodiment, it is preferable that said cargo net is able to sustain a maximum force of at least 0.5 G, more preferably of at least 3 G, even more preferably of at least 6 G, yet even more preferably of at least 9 G, most preferably of at least 15 G.

In a further preferred embodiment, the cargo net according to the invention is a barrier cargo net for restraining cargo or other objects from entering a secure or off limits area. The barrier cargo nets according to the invention may be of any shape or configuration as long as it conforms to a space defined by the top, bottom and the sidewalls of the aircraft. In this further preferred embodiment, it is preferable that said barrier cargo net is able to sustain a maximum force of at least 1 G, more preferably of at least 3 G, even more preferably of at least 9 G, yet even more preferably of at least 12 G, most preferably of at least 15 G. Furthermore, it is preferable that said barrier cargo net has an elongation to break of at most 10%, more preferably an elongation to break of at most 2.5%, most preferably an elongation to break of at most 1%.

Because missiles with IR guided heads are always directed towards the place with the highest IR visibility, i.e. the interior of an open aircraft, the low IR visibility of said barrier cargo net provides a good protection of the aircraft interior against said missiles.

The straps comprising the cargo net according to the invention may slide freely in respect with each other or may be stitched together or connected via connecting means such as metal rings and the like. The ends of said straps may also be provided with means for attaching said cargo net to supports or with means of keeping said cargo net taut.

The connection of such means to said straps is preferably carried out by stitching the straps to said means. More preferably the connection is carried out with lines of stitches. For example when a metal ring is to be connected to a strap, the end of the strap is pulled through the metal ring and folded back on the strap itself over an overlapping length L, encircling the metal ring. The two overlapping strap parts are then stitched together over the overlapping length L using lines of stitches. If required, the straps may be also connected together by lines of stitches at the intersections.

It is preferred that the lines of stitches are extending in a direction making an angle with the longitudinal axis of the strap. Preferably, the angle is at least 20°, more preferably at least 30°, even more preferably a least 45°. Preferably, the angle is at most 70°, more preferably at least 50°. In the most preferred embodiment the angle is about 45°.

In a preferred embodiment, the stitching lines form an X pattern when two straps or two overlapping parts of a strap encompassing a connecting means are to be stitched together.

In a more preferred embodiment, the stitching lines form a WW pattern. In an even more preferred embodiment a combination of X and WW patterns is used.

The advantage of the WW pattern in performing the stitching is that this arrangement ensures that the forces acting on the cargo net according to the invention are substantially equally distributed throughout the connection. Therefore, the connection between said straps or between said strap and the connecting means when a WW pattern is used, presents an efficiency of at least 85%. Also when compared with a connection having an X pattern, a connection with a WW pattern typically has 70% better efficiency.

The stitching is preferably performed utilizing a thin sewing wire comprising multifilament yarns, said sewing wire preferably having a titer of at most 6000 dtex. Because the straps comprising the cargo net according to the invention have a very small width to thickness ratio, the use of a large diameter sewing wire can damage the strap.

In a preferred embodiment, the sewing wire comprises at least one UHMWPE multifilament yarn having a linear density or titer of at least 500 dtex, more preferably of at least 1000 dtex and most preferably of at least 1500 dtex. Preferably, the UHMWPE multifilament yarn comprising said sewing wire has a titer of at most 6000 dtex, more preferably of at most 3000 dtex per yarn, and most preferably of at most 2500 dtex per yarn. More preferably the sewing wire comprises at least 3, more preferably at least 5, most preferably at least 10 multifilament UHMWPE yarns. Said sewing wire preferably comprises at most 20 multifilament UHMWPE yarns.

Furthermore, because the wire has to be thin, it also has to be strong in order to provide a connection with a high efficiency. Preferably, the UHMWPE multifilament yarns comprising said sewing wire have a tensile strength of at least 2.2 N/tex, more preferably of at least 2.8 N/tex and most preferably of at least 3.5 N/tex An advantage of using said wire is that the overlapping length L can be kept short, reducing therefore the stiffness of the connection and consequently the stiffness of the straps comprising the cargo net according to the invention. Preferably, the ratio between the overlapping length L and the thickness of said straps is at least 5:1, more preferably at least 10:1, even more preferably at least 20:1. Preferably, the ratio between the overlapping length L and the thickness of said straps is at most 150:1, even more preferably at most 100:1, most preferably at most and 75:1.

It was surprisingly found that the cargo net according to the invention, presents improved mechanical properties ensuring always a proper fixation and hold of the cargo in place, not only during loading or unloading but also during aircraft take off or landing on most rugged terrains.

It was also surprisingly found that said cargo net presents also a very good abrasive resistance, being therefore extremely resistant to wear and tear. Accordingly, said cargo net has a long life span and can be repeatedly attached and removed from the cargo, dragged across tarmacs and floors as well as being run into an over by machinery, without being damaged or without loosing its strength.

Said cargo net has also improved resistance to damages due to exposure to extreme weather conditions, presenting a very good UV resistance. When subjected to humid environments, said cargo net shows the lowest water up-take, with 70% less than the existing cargo nets made of nylon or polyester.

Yet an even further advantage is that said cargo net according to the invention has a reduced weight, weighing with 40% less than the existing cargo nets made of nylon or polyester.

The invention is further elucidated by the following examples and comparative experiments.

For all comparative experiments and examples, the IR signature of the samples was measured for the two infrared ranges of 3-5 µm and 8-12 µm. The apparatus and the method used to characterize the samples are similar to the ones disclosed in the book of Pieter A. Jacobs *"Thermal Infrared Characterization of Ground Targets and Backgrounds"*, Tutorial Texts in Optical Engineering, Vol. TT70, SPIE Press, Bellingham, Wash., USA, $2^{nd}$ edition, 1996, ISBN 0-8194-6082-6. The method used for IR measurements and a schematic drawing of the apparatus with its technical specifications can be found at pages 99-103.

The only difference between the device used by the inventors to characterize the samples and the apparatus disclosed in the book referred to hereinabove was the sample size. Accordingly, 30 cm long samples were prepared from a several meters long strap, said long strap having a width of 30 cm and a thickness of 0.1 cm, the strap being produced on a belt-weaving machine. Such a large sample size was required in order to obtain reproducible measurements.

COMPARATIVE EXPERIMENT A (COMP. A)

As the first comparative experiment, the IR signature of strap consisting of a mixture of polyethylene therephtalate (PET) and polyamide (PA) yarns was determined. The PET yarns had a tensile strength of 0.8 N/tex and an elongation to break of 13%. The PA yarns had a tensile strength of 0.8 N/tex and an elongation to break of 20%.

COMPARATIVE EXPERIMENT B (COMP. B)

For the second comparative experiment a strap consisting entirely of PET yarns was used. The PET yarns had a tensile strength of 0.8 N/tex and an elongation to break of 13%.

EXAMPLE 1 (EX. 1)

The IR visibility of a strap comprising UHMWPE yarns, said yarns having a tensile strength of about 3.51 N/tex and an elongation to break of about 3% was measured. The titer of the yarns was about 1760 dtex. The yarns are being marketed under the name of Dyneema® SK75. The strap had a weight per unit area of about 270 g/m$^2$ and a twill weave 5:1 construction, said strap being known under the name Dyneema® W557.

EXAMPLE 2 (EX. 2)

The second example used the same Dyneema® SK75 yarns. The strap had a weight per unit area of about 314 g/m$^2$ and a plain weave 1:1 construction, the strap being known under the name Dyneema® W554.

The results are summarized in the following table.

| Sample | Heat conduction W/mK | Thermal emission coefficient 3-5 µm | Thermal emission coefficient 8-12 µm | Number of absorption peaks 3-5 µm | Number of absorption peaks 8-12 µm |
|---|---|---|---|---|---|
| Comp. A | 0.173 | 0.78 | 0.90 | 3 | >5 |
| Comp. B | 0.15-0.4 | 0.79 | 0.91 | 0 | >5 |
| Ex. 1 | 20 | 0.42 | 0.41 | 2 | 0 |
| Ex. 2 | 20 | 0.48 | 0.52 | 2 | 0 |

For all the examples and comparative experiments, a thermal emission coefficient was measured, said coefficient being a measure of IR visibility. The measurements clearly showed the large difference between PET based and UHMWPE based straps. This difference is especially clear in the spectral range of 8-12 µm. In this range, the thermal emission coefficient was 0.9 for PET based straps whereas for UHMWPE based straps, the thermal emission coefficient was less than 0.52. Also for the spectral range of 3-4 µm the UHMWPE based straps showed a much lower thermal emission coefficient; i.e. less than 0.48 in comparison with 0.78 for PET based straps.

Even though for both Dyneema® W554 and Dyneema® W557 constructions two absorption peeks can be seen in the IR spectra, Dyneema® W554 presents a higher IR visibility than the IR visibility of Dyneema® W557. Therefore, it is preferably that the construction used to build the straps comprising the cargo net according to the invention, provides said straps with a rougher surface, i.e. Dyneema® W557, such a rough surface helping in keeping the IR visibility at low values.

From the measurements above it can be concluded that the UHMWPE based straps have a much lower IR visibility than the PET based straps. The low IR visibility makes the cargo net comprising the UHMWPE based straps according to the invention hardly visible with thermal imaging devices and therefore providing an effective camouflaging of the cargo. Also when used as cargo barrier nets inside the aircraft, the low IR visibility makes the barrier cargo net according to the invention practically invisible during nighttime.

The invention claimed is:

1. A cargo net comprising a plurality of interconnected straps arranged in a lattice structure, wherein the straps comprise ultrahigh molecular weight polyethylene (UHMWPE) multifilament yarns, the UHMWPE yarns having a tenacity of at least 1.9 N/tex, and wherein the straps are connected to each other by stitching containing lines of stitching forming at least two W patterns.

2. The cargo net of claim 1 characterized in that the polyethylene yarns have a tenacity of at least 2.8 N/tex.

3. The cargo net of claim 1, wherein the straps have a width of at least 1 cm.

4. The cargo net of claim 1, wherein the straps have a width/thickness ratio of at least 5:1.

5. The cargo net of claim 1, wherein the straps have an n-ply webbing construction.

6. The cargo net of claim 1, wherein the straps have an elongation to break of at most 6%.

7. The cargo net of claim 1, wherein the cargo net is able to sustain a maximum force of at least 0.5 G.

8. The cargo net of claim 1, wherein the cargo net is a barrier cargo net.

9. The cargo net of claim 1, wherein the cargo net is able to sustain a maximum force of at least 1 G.

10. The cargo net of claim 8, wherein the straps have an elongation to break of at most 10%.

11. The cargo net of claim 1, wherein the stitching comprises lines of stitches in a WW sewing pattern.

12. The cargo net of claim 1, wherein the stitching comprises lines of stitches in a combination of X and WW sewing patterns.

13. The cargo net of claim 11 or 12, wherein the stitching comprises sewing wire which is made out of at least one UHMWPE multifilament yarn having a linear density of at least 500 dtex/yarn.

* * * * *